US012488071B2

(12) United States Patent
Mares (10) Patent No.: US 12,488,071 B2
(45) Date of Patent: Dec. 2, 2025

(54) APPARATUS AND METHODS FOR PROVISIONING AUTHORIZED SERVICES (71) Applicant: Jesus Mares, Imperial, CA (US)

(72) Inventor: Jesus Mares, Imperial, CA (US)

(*) Notice: Subject to any disclaimer, the term of this patent is extended or adjusted under 35 U.S.C. 154(b) by 79 days.

(21) Appl. No.: 18/612,313

(22) Filed: Mar. 21, 2024

(65) Prior Publication Data
US 2024/0320311 A1 Sep. 26, 2024

Related U.S. Application Data (60) Provisional application No. 63/491,813, filed on Mar. 23, 2023.

(51) Int. Cl.
G06F 21/31 (2013.01)
G06F 21/33 (2013.01)
G06F 21/45 (2013.01)
H04L 9/40 (2022.01)

(52) U.S. Cl.
CPC ............. G06F 21/31 (2013.01); G06F 21/45 (2013.01); G06F 21/33 (2013.01); H04L 63/08 (2013.01)

(58) Field of Classification Search
USPC .......................................................... 726/7
See application file for complete search history.

(56) References Cited

U.S. PATENT DOCUMENTS

| | | | |
|---|---|---|---|
| 11,443,301 B1* | 9/2022 | Hayes | G06Q 20/326 |
| 11,716,331 B2* | 8/2023 | Taugbøl | H04L 63/083 |
| 2006/0165060 A1* | 7/2006 | Dua | G06Q 20/322 705/76 |
| 2014/0040117 A1* | 2/2014 | Jain | H04W 52/0254 235/492 |
| 2016/0048549 A1* | 2/2016 | Patterson | H04W 4/029 707/690 |
| 2018/0307381 A1* | 10/2018 | Bashir | G06Q 10/10 |
| 2021/0209200 A1* | 7/2021 | Nambannor Kunnath | G06F 21/44 |

* cited by examiner

Primary Examiner — Sakinah White Taylor
(74) Attorney, Agent, or Firm — Wang Hardoon, P.C.

(57) ABSTRACT

Systems, apparatus, and methods for provisioning authorized retailer services. Entities may license the use of a tradename because it serves as an indicium of quality to customers and/or identify the source of goods/services. Search engines are a powerful tool for navigating the ever-changing landscape of the internet, however they are easily abused by bad actors. Keyword-based filters cannot differentiate between legitimate and illegitimate word usage. The solutions described herein leverage the vetting processes of a customer's trusted $3^{rd}$ party online marketplace to provide a customer service portal application to the customer. The commercial activity within the portal application is authorized, allowing the service provider's indicia to preserve their commercial value against one another. Customers may directly compare competing brands according to their own perceived value, without fear of counterfeits, etc.

20 Claims, 5 Drawing Sheets

APPARATUS AND METHODS FOR PROVISIONING AUTHORIZED SERVICES

PRIORITY APPLICATIONS

This application claims the benefit of priority to U.S. Provisional Patent Application Ser. No. 63/491,813 filed Mar. 23, 2023 and entitled "APPARATUS AND METHODS FOR PROVISIONING AUTHORIZED SERVICES", the foregoing incorporated by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This disclosure relates generally to the field of service provision. More particularly, the present disclosure relates to systems, computer programs, devices, and methods for discovery and sale of authorized retail services via alternative channels (e.g., to avoid keyword filtering).

DESCRIPTION OF RELATED TECHNOLOGY

As used herein, the term "resale" and its linguistic derivatives refer to the commercial activity of buying goods, and then selling them at a mark-up. Resellers do not enjoy any specific privilege, they merely profit from identifying market inefficiencies (e.g., arbitrage, etc.). In contrast, "retail" entities acquire products/services in bulk (e.g., "wholesale") from a manufacturer or service provider under a preferred relationship; the wholesale products/services, are then subdivided and sold to customers. An "authorized retailer" is an independent entity that has been officially appointed by a manufacturer or service provider to sell its products or services. In some cases, authorized retailers can also issue warranties and provide after-sales support on behalf of the manufacturer.

While resale has always existed, the explosion in popularity of online shopping has allowed some resellers to make significant profits. For example, a reseller may buy goods from a local manufacturer at normal prices, and then sell them online at significant mark-up to customers across the globe. Because resellers briefly hold the product/service between sales, resellers have the risk and reward of holding inventory, etc.

Unfortunately, the anonymity and fluidity of online markets also enables certain resellers to engage in problematic, sometimes illicit, behavior. For example, resellers may pass-off counterfeit goods, or misrepresent services. In some cases, these behaviors are so egregious that manufacturers and service providers actively seek to discourage resale activity. As another complication, authorized retailers often experience significant difficulty distinguishing themselves from unauthorized resellers. For example, resellers can copy text, logos, and/or other readily appreciated indicia of authenticity in violation of trademark and copyright. This can result in market confusion as customers are unable to distinguish between authorized retailers and illicit resale.

Search engines and online marketplaces have attempted to clamp down on illicit resale activity with brute force techniques. For example, keyword searches may automatically flag and/or penalize tradenames or logos. As a practical matter, these enforcement mechanisms often inadvertently catch authorized retailers. While unauthorized resellers frequently change their techniques to get around these ever-changing countermeasures, they present significant challenges for authorized retailers to navigate.

DETAILED DESCRIPTION

In the following detailed description, reference is made to the accompanying drawings which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without departing from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Internet, Television, Telecommunication, Home Security Service Providers

Creating communication networks requires monumental investments in labor, equipment, and manpower. Streets must be trenched to lay cabling, buildings must be permitted and modified, etc. Historically, these initial outlays were heavily subsidized by the cities and communities, in exchange for a limited time monopoly. Until relatively recently, most consumers did not have a choice in their Internet, television, telecommunication (phone), and/or home security service providers. The insular nature of these networks also meant that service providers did not have to align their practices with other service providers; in other words, each service provider has developed their own methods and processes for customer service, billing, service offerings, etc.

Changes to government regulation have ended the aforementioned monopolies. As a result, service providers have made new investments in infrastructure and/or implemented favorable cross-usage agreements that now allow customers significantly more freedom in their service providers. This has created a unique circumstance where customers moving between service providers are often surprised by differences in customer service, billing, and/or features, etc. In many situations, customers incorrectly assume that the services offer similar products/services, when they do not.

As a related note, while monopolistic practices have been curtailed, service offerings are not uniform. Different service providers have different business models which may or may not make sense in some communities. For example, a metropolitan area may be heavily contested, and customers in this area may have many different options for their service offerings. In contrast, a rural area may only have two or three service providers that only provide a few options. In many situations, navigating service options may be confusing and/or non-intuitive for customers.

Within this context, authorized retailers have become an important intermediary between service providers and their customers. Typically, authorized retailers do not "resell" service contracts or inventory. Instead, they are separate business entities that maintain customer service staff and infrastructure to provide sales and support to customers in ways that a larger organization often cannot. For example, authorized retailers may have regional response times that are much shorter than a service provider (which must accommodate calls from all geographies, time zones, etc.). As a practical matter, authorized retailers obtain preferential treatment (i.e., "a preferred relationship") in terms of pricing and/or access—this margin is important for profitability. In many cases, authorized retailers maintain relationships with multiple different service providers, and are incentivized to cultivate a consistent customer service relationship regardless of the underlying contract being sold. In fact, sometimes the long-term relationship with customers is more important to the authorized retailer, than even the service provider.

Unfortunately, illicit resellers have been able to flourish within the aforementioned deregulated markets. Illicit resellers can create sham businesses which may sell Internet, TV, telecommunication (phone), and/or home security services that do not exist, or which are incorrectly advertised. In many cases, they may advertise themselves on websites as legitimate affiliates, despite having no real affiliation. Once caught, the unauthorized reseller evaporates-they can end their virtual websites, phone numbers, etc. leaving the customer locked into a contract they did not want.

Online fraud is not a new problem. Conventional techniques for addressing malicious behavior are data-centric. For example, search engines regularly "crawl" or "spider" for the unauthorized use of corporate logos and/or word marks. In many cases, these brute force techniques cannot distinguish between illicit resellers and authorized retailers. In other words, authorized retailers need improved solutions for reliably and robustly providing their services.

Exemplary Customer Service Portal Application

Figure 1:
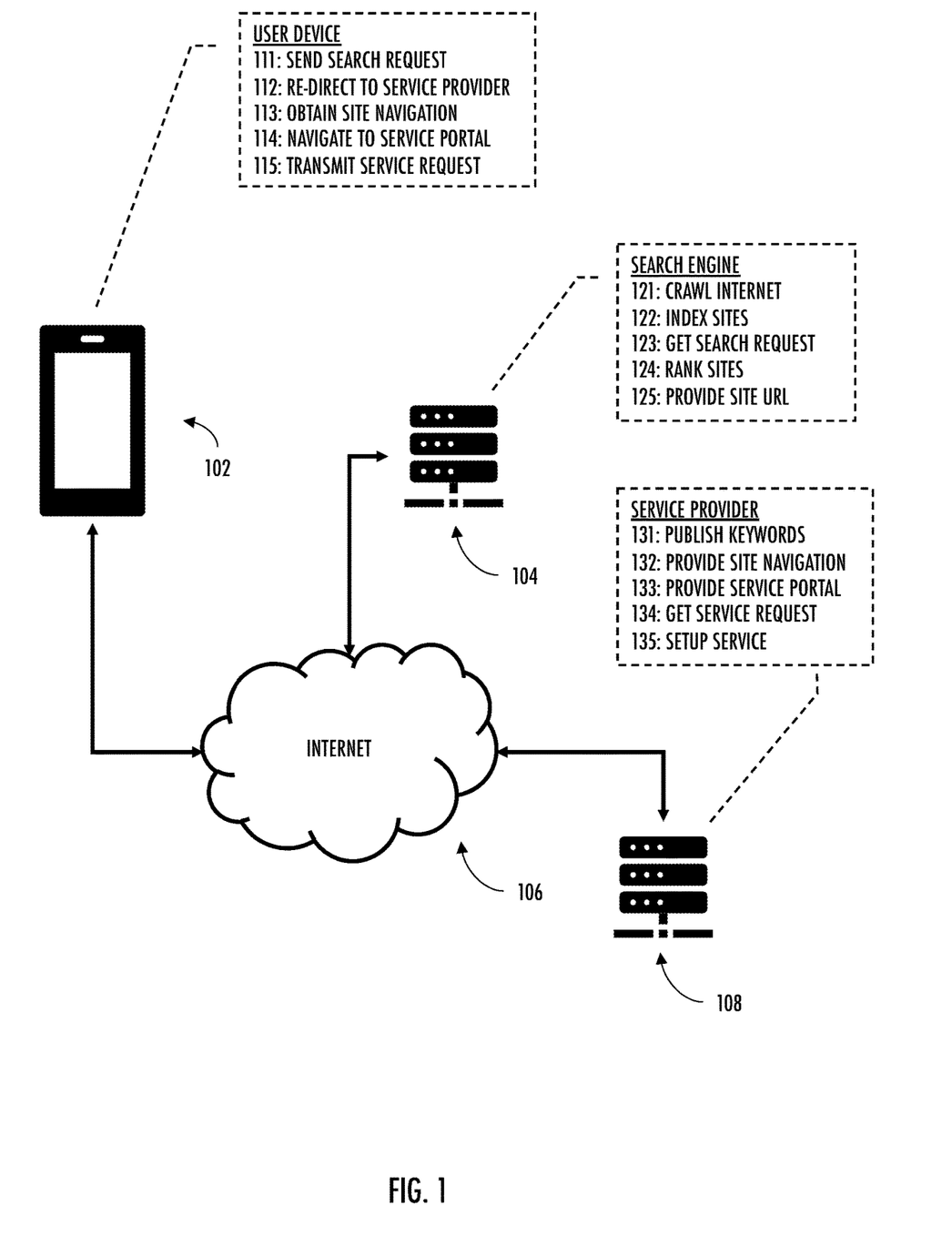
FIG. 1 is a graphical representation of one web presence-based model of service provisioning.

Consider the conventional "web presence" model of service providers, as illustrated in FIG. 1. Most people begin their search on a search engine. For example, a user device 102 connects to a search engine might send a search request e.g., "who is my local internet service provider?" (step 111). The search request is sent to a search engine 104.

As a brief tangent, the search engine 104 continually "spiders" or "crawls" the internet 106 to map all available web pages (step 121). The "spider" program follows links from one page to another, continuously indexing new and updated content. Whenever a web page is discovered or updated, the search engine indexes its content (step 122). This involves parsing and storing information from the page, including text, images, meta tags, and other elements. The indexed content is then organized in a massive database, making it easier to retrieve relevant results later.

Here, the search engine 104 responds to the user device 102 search request based on its current database of the internet (step 123). Specifically, the search engine retrieves relevant candidate pages from its index. It then ranks these pages based on various factors such as relevance, quality, authority, and user experience (step 124). Pages that are deemed more relevant and authoritative are typically ranked higher in the search results. For example, a service provider 108 might use keywords and/or search engine optimization (SEO) techniques to increase its search ranking.

The search engine 104 provides the ranked results to the user device 102 (step 125). These results typically include a mix of organic (unpaid) listings and paid advertisements. The user can then click on the search results to be re-directed the selected webpage. In this case, the user selects a service provider 108 (step 112).

Different service providers organize their web presence differently; typically, the user hits a landing page and then uses site navigation to determine where to go next. In this case, the service provider 108 provides the site navigation to the user device 102 (step 132 and step 113) and the user device navigates to the service portal (step 114). The service provider's service portal accepts service requests (step 115 and step 134) and e.g., performs account setup, account modification, etc. (step 135).

Unfortunately, the conventional web presence model is easily attacked. One of the most common attacks is to take advantage of the search engine. In other words, an illicit reseller may create a new web page that uses search engine optimization (SEO) techniques to achieve a very high ranking for certain types of search requests (e.g., account setup and/or billing modifications). The illicit reseller may additionally copy text, logos, and/or other readily appreciated indicia of authenticity in violation of trademark and copyright. An unwary user may select the illicit reseller's website, mistakenly believing that they are going to a legitimate business. Once connected to the illicit reseller's website, they may divulge sensitive information (billing information) and/or sign up for services with unfair rates. While this behavior is illegal, an illicit reseller is unlikely to keep the website up long enough to be caught.

As previously mentioned, search engines and online marketplaces have attempted to clamp down on illicit resale activity with brute force techniques. However, these enforcement mechanisms often inadvertently catch authorized retailers—while this most directly affects authorized retailers, it also has undesirable effects on customers and service providers. Afterall, authorized retailers are smaller businesses that are able to offer highly targeted market incentives and can also provide more nimble customer service than a larger organization.

More directly, the existing web presence business model introduces a new technological problem. Authorized retailers cannot use keywords or logos to advertise their legitimate business affiliations, even though illicit resellers will. Without these indicia, customers will be waylaid by bad actors. In other words, the existing search engine mechanism is designed to continuously map and index an anonymous and fluid network (the internet). This is poorly suited for businesses that need to maintain a consistent and convenient customer experience.

Various embodiments of the present disclosure are directed to a customer service portal application for authorized service provisioning. Consider the exemplary "portal-based" authorized retail model illustrated in FIG. 2. Instead of searching the internet, the customer visits a virtual application store 204 on their user device 202 (step 211).

Figure 2:
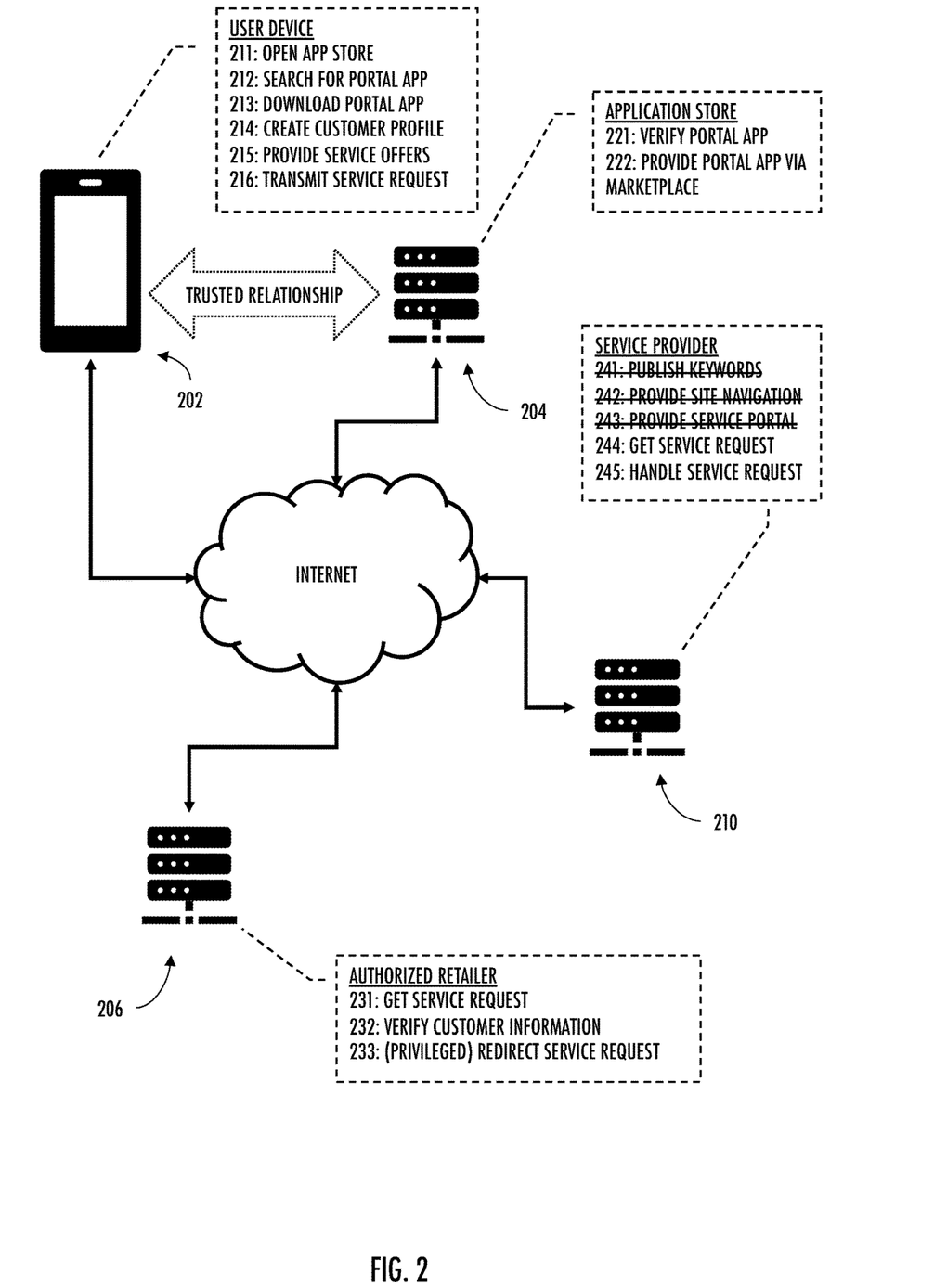
FIG. 2 is a graphical representation of one portal-based model of service provisioning.

A virtual application store (or "app store") is an online marketplace where users can browse, download, and install software applications (apps) for their devices. App stores are usually operated by an entity (e.g., Apple, Google, Microsoft, etc.) that has a trusted relationship with the user; for example, the app store may be operated by, or on behalf of, the manufacturer of the user device. In other words, the app store provides a software ecosystem that the customer can enjoy as a benefit of patronage. One of the most tangible benefits of the app store is that the app store validates and verifies its catalogue of applications before distribution (step 221). In fact, most app stores cryptographically "sign" legitimate applications; an unsigned or incorrectly signed application cannot be run by the user device.

As used herein, the terms "validate" and "verify" are independent procedures that may be used together or in isolation to ensure that software meets certain requirements and/or specifications. Specifically, validation refers to actions taken by a party to check objective conformance to a stated requirement or specification. For example, the app store may validate that an authorized retail portal performs the functions necessary to serve as an authorized retail portal. In contrast, verification refers to actions taken by a party to check that a statement is truthful. For example, the app store may verify that the software developer of the authorized retail portal is a legitimate business licensed to operate, and subject to regulation, etc. Notably, different app stores may implement different degrees of validation and/or verification.

Here, the authorized retailer may submit an authorized retail portal app to the app store administrator for verification/validation (step 221). The app store administrator may flag keywords and/or logos as being potentially problematic; in response, the authorized retailer may submit supporting documents (authorized retail agreements, etc.) that evidence legitimate usage. Other formalities may also be resolved at this juncture. Once approved, the authorized retail portal app is signed by the app store, and may be published to the online market place (step 222).

In the cryptographic arts, the term "signature" and its linguistic derivatives refer to cryptographic techniques used to verify the authenticity, integrity, and origin of a digital message, document, software, or other digital content. Typically, the digital content is hashed to generate a unique fixed-length string of characters called a hash value or digest. The hash value represents the content of the message in a condensed and secure format. A private key is used to encrypt the hash value of the message, creating the digital signature. This process is performed using asymmetric encryption algorithm, where the private key is known only to the CA, ensuring that only the CA can produce a valid signature for the message. Any entity with the public key that matches the private key can decrypt the digital signature to generate a check value; if the check value matches the decrypted hash value, then the digital content has not been altered since it was signed.

Referring back to FIG. 2, the user device 202 searches for, and finds, the authorized retailer's portal app (step 212) in the online marketplace. The user device downloads the portal app, checks the signature, and then installs the portal app (step 213).

Once installed, the user device 202 can create a customer profile (step 214) which may include a variety of different customer information. For example, the customer profile may include name, phone number, email, zip code, password, etc. Here, the user profile enables the authorized retailor portal to tailor the user experience and facilitate interactions between the user and the platform.

Within the context of the present disclosure, there may be multiple different accounts associated with a single user. For example, the user may have an account with the user device, the authorized retailer, and each of their service providers. This may be important for a variety of different reasons (security, privacy, etc.). For the sake of clarity, the present discussion uses "device account" to refer to a user account at the user device, a "retail account" to refer to a user account with the authorized retailer, and "service account" to refer to a user account with a service provider.

At step 215 of FIG. 2, the user profile may be used by the authorized retail portal to identify the services and discounts that the customer may be eligible for. As but one such example, the service providers may offer area-specific based on zip code. As another such example, service providers may offer loyalty programs, upgrades based on user history, incentives to try out new programs and/or service bundles (e.g., home internet, home security, wireless, etc.). Each offer may identify the service provider by logo, name, slogans, catchphrases, trademarks, and/or other commercially valuable keywords. Other information may include descriptions, pricing information, website links, phone numbers, etc.

Using the portal interface, the user may select and transmit a request for new services and/or modifications to existing services (step 216). In some cases, the authorized retail portal may connect to the authorized retailer's servers 206 (step 231); the authorized retailer may verify the customer information against its own copy of the user profile (step 232). Once verified the authorized retailer may redirect the service request—in some cases, this may be performed with additional privileges (step 233). In other implementations, the authorized retail portal may directly connect to the service provider (step 244) to handle the service request (step 245). In this case, the authorized retail portal may directly connect to the appropriate customer service center (rather than being bounced through layers of call centers and/or wading through site navigation).

Figure 3:
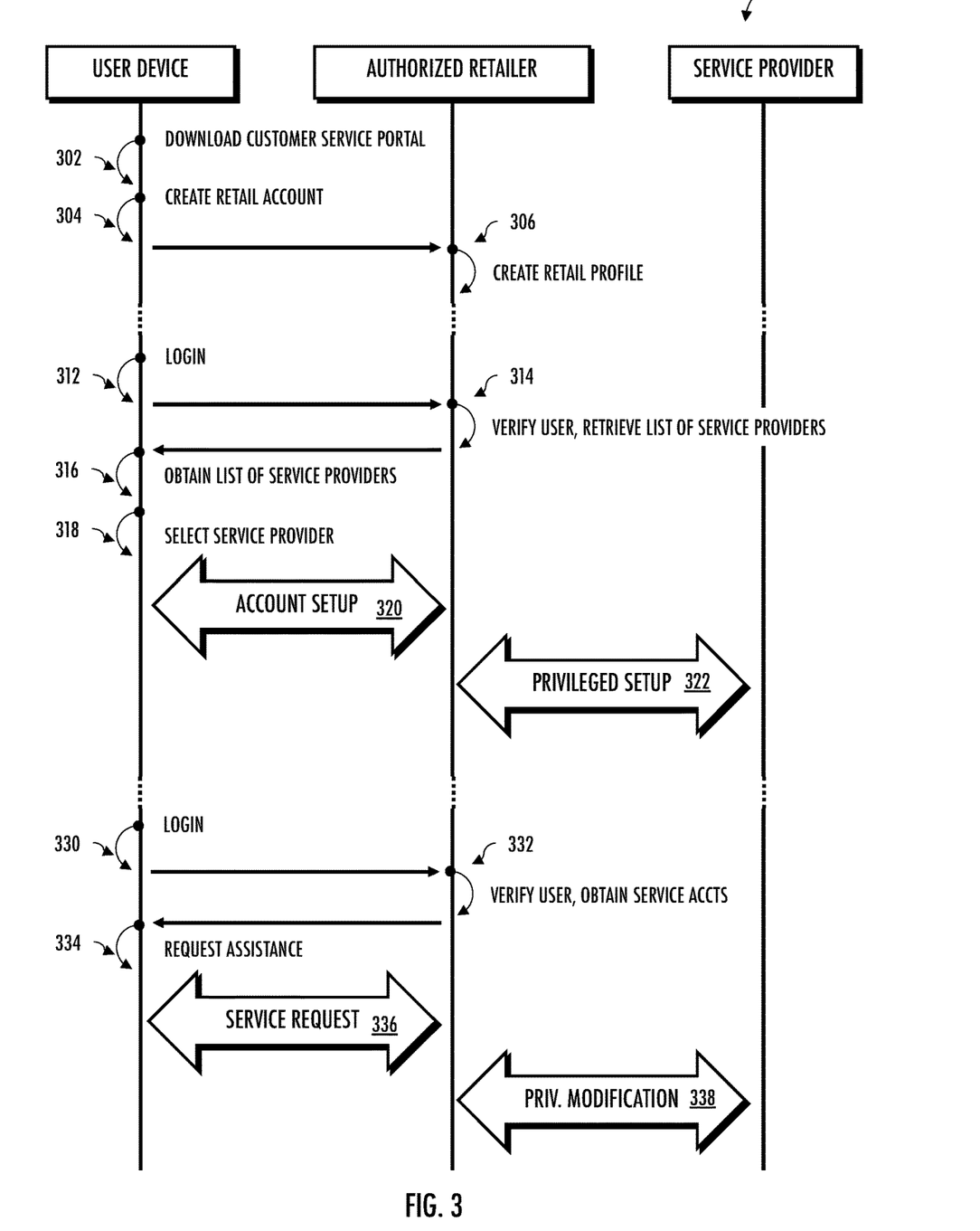
FIG. 3 is a logical flow diagram of one exemplary customer interface flow.

FIG. 3 presents a logical flow diagram 300 of one exemplary customer interface flow. While the foregoing discussion is presented in terms of service requests, the customer service portal application may be used for initial account setup as well as subsequent modifications. In other words, the customer service portal application provides a single point of service for the user, persisting across time and service contracts.

At step 302, a user downloads a customer service portal application to the user device. In one embodiment, the customer service portal application can be downloaded to a user device via an online application marketplace. As a brief aside, the online application marketplace will have verified the identity of the authorized retailer entity, and their authorization to use corporate logos, wordmarks, and other forms of intellectual property (patent, trademark, copyright, trade secret). For example, the authorized retailer may be required to provide proof of their authorization to the online application marketplace, as part of the vetting process, prior to placement. In other words, the online application marketplace is not an anonymous and uncontrolled hosting (i.e., unlike the Internet), but rather a controlled marketplace that ensures that the customer service portal application (and all other applications) is both authentic and authorized for distribution. One example implementation of the customer service portal application is included in APPENDIX A.

If the user does not have an existing retail account, then the user creates a retail account with the authorized retailer at step 304. As part of the retail account creation process, a user provides their name, e-mail, phone number, address information (e.g., zip code), and password. In some cases, the user may also need to agree to certain terms of usage and/or privacy policy. User entered information may be verified for accuracy (e.g., address look-up, phone verification, etc.) and/or validated according to set heuristics (e.g., phone number has 10 digits, zip code has 5 digits, password meets security requirements, etc.). On successful verification and/or validation, a user profile is created (step 306).

At a later point in time, the user may want to sign-up for a service. The user logs into their customer service portal application at step 312. The authorized retailer verifies the user; on successful verification, the authorized retailer may retrieve a default list of service providers based on the user's profile information (step 314). In one specific implementation, the default list of service providers may be selected based on the user's zip code.

At step 316, the list of service providers is provided to the user. In some variants, the user may be able to change the search criteria (e.g., the user may provide a different zip code based on their current location, etc.). Other common filter criteria may include e.g., price, download/upload data rates, supported users ("family plans"), included equipment, equipment requirements, features (included channel bundles, voice minutes, international minutes, etc.), etc. In some cases, these search criteria may be included as part of the user profile. For example, a user's profile might indicate that their household has 5 family members, and that they prioritize international call rates, etc.

In some variants, the user may identify a specific category from different categories of service. For example, the authorized retailer may provide a list of internet service providers, television, telecommunications, and/or home security options. As previously noted, these options can be pre-screened based on the user's profile information (or modified based on user input).

At step 318, the user selects a service provider based on their specific needs, the user calls the authorized retailer using e.g., a toll-free number (TFN). The TFN is routed to a call center of the authorized retailer that is streamlined to set-up service accounts with the selected service provider. The customer service representative of the authorized retailer can take some additional customer information and may have access to a privileged account set-up process, by virtue of their authorized retailer status (steps 320 and 322). Customer set-up may be performed in just a few minutes, then the customer may be transitioned over to the service provider associates to e.g., schedule equipment delivery and set-up, etc.

Occasionally, a user may have a customer service issue. In these cases, the user logs into their customer service portal application at step 330. The authorized retailer verifies the user. On successful verification, the authorized retailer retrieves the user's current user profile information along with any information regarding their current service providers (step 332). The user may then identify the specific service provider they need assistance with (step 334) and may start a service request 336. The service request may be internally routed by the authorized retailer to the appropriate service provider; in some cases, the authorized retailer may have additional privileges to modify the service based on the user request (step 338). Alternatively, the authorized retailer may forward the user to the appropriate service provider department (not shown). In some cases, the authorized retailer may additionally track customer service requests (e.g., service tickets). This may be particularly useful to track and/or fix endemic and/or chronic issues.

Technological Improvements and Other Considerations

The above-described system and method solves a technological problem in industry practice related to web-presence based business models. Certain keywords, phrases, logos, etc. have significant commercial value—for example, entities may license the use of a tradename because it serves as an indicium of quality to customers and/or identify the source of goods/services. Search engines are an incredibly powerful tool for navigating the ever-changing landscape of the internet, however they are easily abused by bad actors. While the motivation is commercially driven, the underlying challenge is technological since keyword-based filters cannot differentiate between legitimate and illegitimate word usage.

The various solutions described herein leverage the vetting processes of a customer's trusted 3rd party online marketplace to provision the customer service portal application to the customer. The trusted 3rd party additionally signs the customer service portal application, which enables installation within the customer's user device. Importantly here, the authorized retailer may now freely use the licensed keywords, phrases, logos, etc. within the confines of the customer service portal application-illicit resellers cannot release software distributions in this manner (nor would any customer be interested in such software).

Notably, there is an additional subtle distinction; the vetting process was originally developed to prevent a software developer from passing off counterfeit applications of another developer. In other words, the trusted $3^{rd}$ party online marketplace ensured that the keywords, phrases, logos, etc. were owned by the developer entity. Here, the authorized retailer has licensed (but does not own) the keywords, phrases, logos, etc. Authorized retail is also different from merely selling branded products because the authorized retailer has paid for the requisite business affiliation and the right-to-use to use the specific keywords, phrases, logos, etc. Again, while the business arrangement is a commercial/legal instrument, the underlying technology and mechanisms of the broader internet do not distinguish between legitimate and illegitimate use of text and/or media and cannot be used to enforce such agreements. In contrast, the trusted 3V party online marketplace has the power to remove the customer service portal application, and they provide an adjudication forum for the authorized retailer and any service provider. In other words, the techniques described herein allow any one of the authorized retailer's associated service providers to take down the portal for an alleged violation. More broadly, the concepts present a technological solution for multi-party control over the use of digital assets.

As a practical matter, the customer understands that the commercial activity within the portal application is authorized, allowing the service provider's indicia to preserve their commercial value against one another. Customers may directly compare competing brands according to their own perceived value, without fear of counterfeits, etc.

As a wholly separate but equally important anecdote, customers generally search for the types of services they desire (e.g., cellular, internet, home security, etc.), and consider the branding as a component of quality that is factored into the pricing. In other words, the specific branding and/or other commercially valuable keywords and images of service providers are not useful for search indexing. Instead, the customer service portal application may match a customer to the services that they qualify for, based on their customer profile. For example, the customer may search for a type of service, and be matched according to their customer profile e.g., zip code, existing subscribership, loyal customer/new customer status, etc. In fact, a search may not even be necessary—the customer may be pushed offers based on their customer profile. Importantly, the customer profile is specific to the customer, and may be re-used across many different interactions with the authorized retailer. More directly, the customer service portal application matches customers to service providers based on the customer profile; this is a technologically different solution than a search engine that matches customers to service providers based on the relevance to their search query.

Furthermore, providing site navigation resources to a user device consumes a significant amount of data (graphics, visualizations, and/or other media). Service providers often use their web sites as an extension of their own business model (e.g., selling devices, premium services, upselling products, etc.). They may have established market presences and often take a business-centric view to differentiate themselves from their competition. For example, an established service provider may leverage existing network installations to off broader network coverage, whereas a newer service provider may invest large amounts of capital to offer higher performance in a smaller footprint. Still other service providers may negotiate with other businesses/technologies to offer different "perks" to their customers (e.g., roaming agreements, add-on services, etc.).

As a practical matter, the service provider's site navigation often seeks to entice a customer into buying services; this may be intentionally burdensome for existing and/or disgruntled customers. In fact, many service providers only rely heavily on $3^{rd}$ party call centers for their customer service inquiries. This problem is also compounded when dealing with multiple different service providers, since each service provider organizes their site differently. For a variety of reasons, site navigation cannot be eliminated for customers (and even authorized retailers) within the web-presence based business models.

As another technological improvement, the customer service portal application avoids site navigation for certain types of queries. Sometimes a customer may want to explore a service provider's offers, compare different offers, etc. In other cases, the customer may want to reach customer service to e.g., add/modify/remove their existing terms, pay their bill, etc. Often, these queries are only informative—the customer may not change anything. Here, the user device allows the user to explore these options locally within the application's consistent navigation framework and locally cached data (avoiding data transfers over the network). If the customer wants to contact customer service, they may be directly routed to the appropriate contact. In some cases, the customer service portal application may even have access to privileged connections that are reserved for authorized retailers and/or not otherwise exposed to the broader public. In other words, the above-described system and method improves the functioning of the computer/device by minimizing unnecessary data transfers and/or re-directions.

Furthermore, the customer may be (but usually is not) exclusive to a single service provider. In many cases, a customer's needs may be better served with piecemeal services sourced from different service providers. For example, a customer might want broader coverage for business travel which would be with one service provider, but also want home security add-ons sourced from a different service provider. Advantageously, the exemplary authorized retailer's portal application may serve as a gateway to access personalized content, tools, and functionalities tailored to the needs of a customer. In one specific implementation, the authorized retailer's portal may allow a user to create a user profile which can be used to establish accounts across different service providers. In addition, the authorized retailer's portal may aggregate their service contracts with different service providers together, so that the user can manage, create, remove, and/or modify service accounts from a single point-of-contact. In other words, the techniques described herein represent an improvement to the field of service provisioning.

System Architecture

Figure 4:
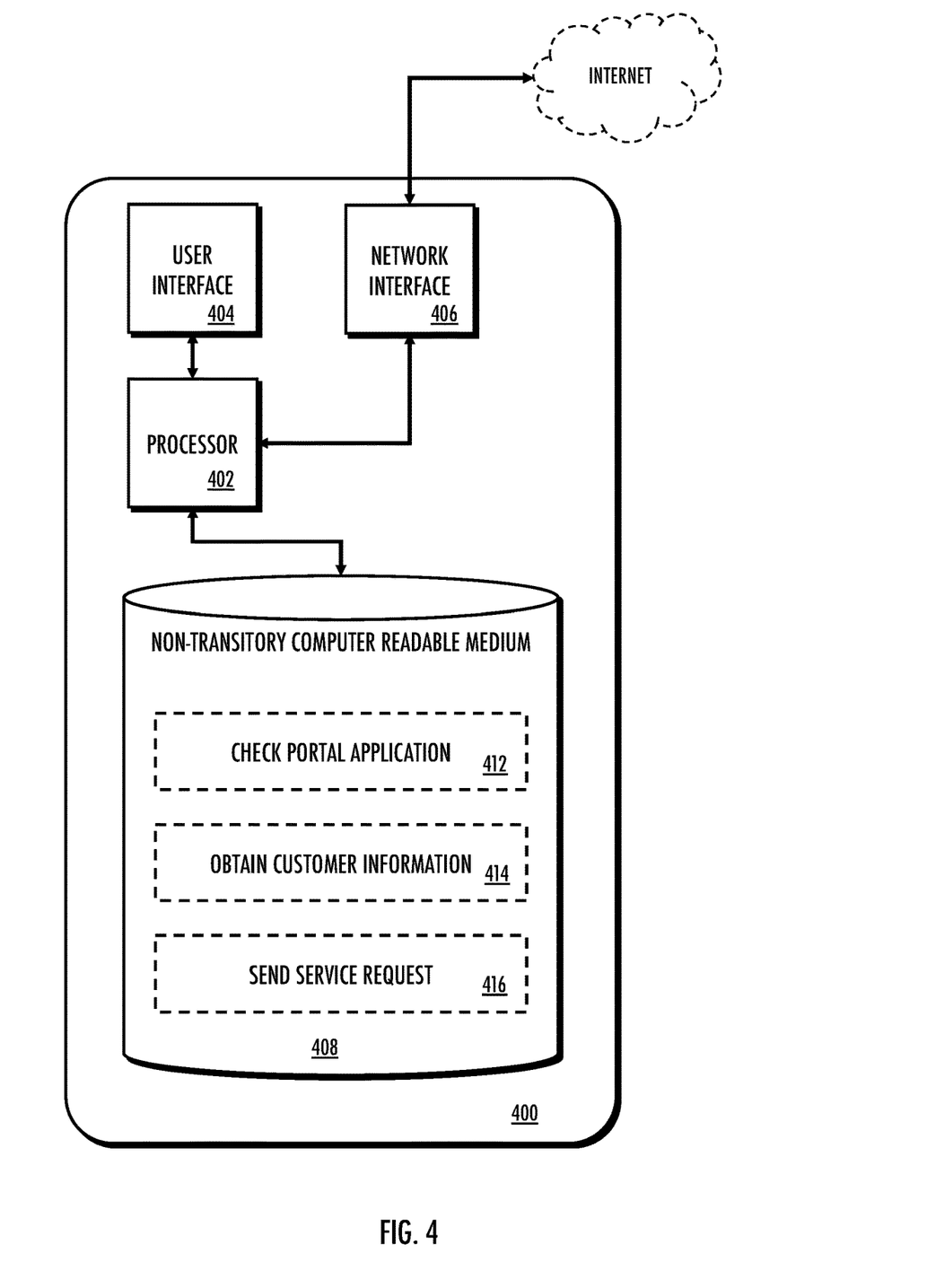
FIG. 4 is a logical block diagram of one user device, useful in conjunction with the various principles described herein.
Figure 5:
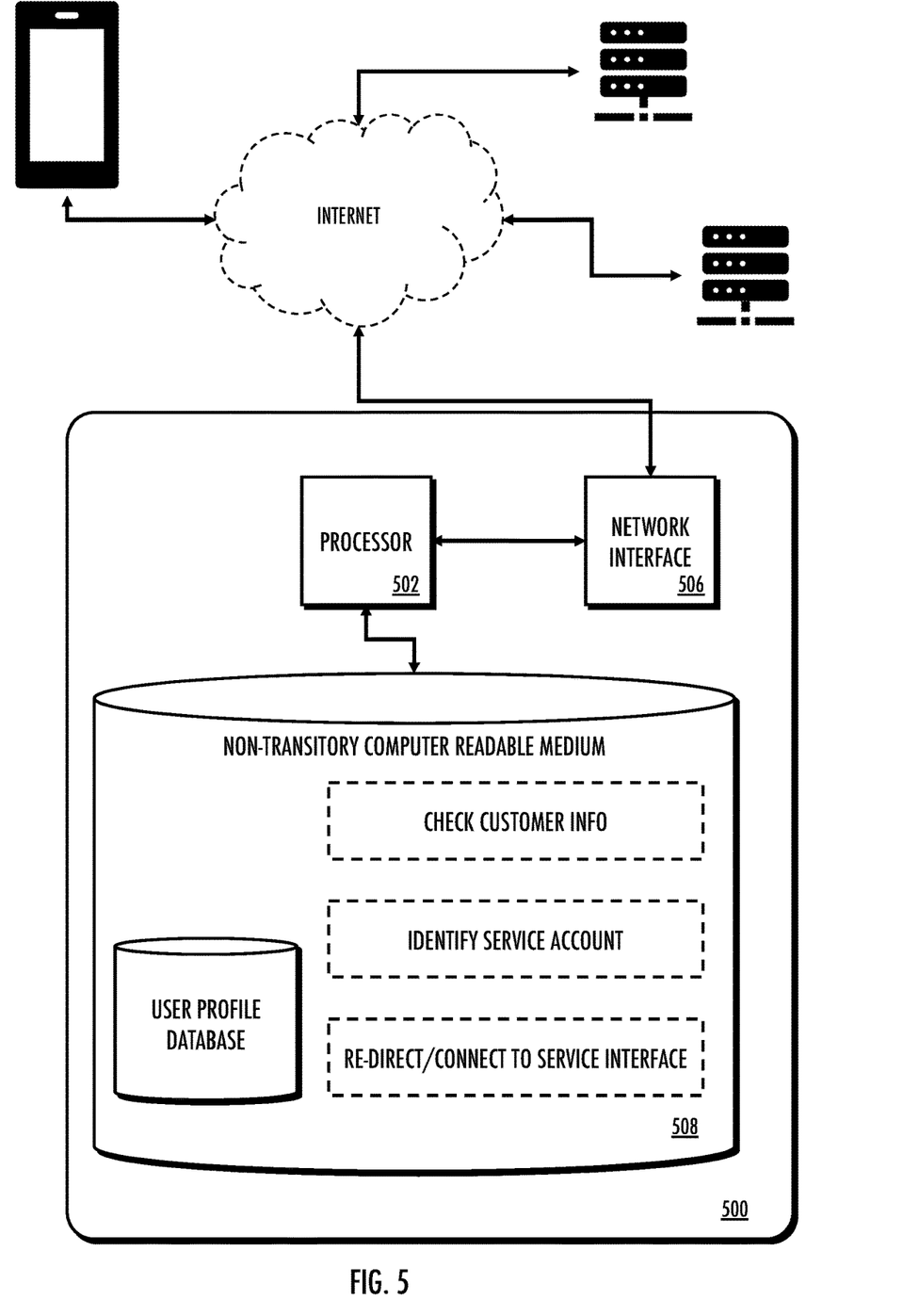
FIG. 5 is a logical block diagram of one server, useful in conjunction with the various principles described herein.

The exemplary system includes: a user device 400, a server 500, and a communication network. In one specific implementation, the authorized retailer customer service portal application is executed from the user device 400 and connects to the authorized retailer server 500. In other implementations, the server 500 may be used to host a virtual application store and/or the service provider's customer service.

While the following discussion is presented in the context of a two-device system, artisans of ordinary skill in the related arts will readily appreciate that the techniques may be broadly extended to other topologies and/or systems. For example, the user device may communicate with an authorized retailer's customer service portal which manipulates the service provider's database, on behalf of the user. As but another example, the authorized retailer's customer service portal may receive service notifications from multiple different service providers (e.g., cellular, internet, home security, etc.) that are then provided to the user via a single cohesive framework within the customer service portal application.

The following discussion provides functional descriptions for various logical entities of the exemplary system. Artisans of ordinary skill in the related art will readily appreciate that other logical entities that do the same work in substantially the same way to accomplish the same result are equivalent and may be freely interchanged. A specific discussion of the structural implementations, internal operations, design considerations, and/or alternatives, for each of the logical entities of the exemplary system is separately provided below.

User Device

Functionally, a user device 400 allows the user to download and run a portal application. In one aspect, the user device 400 checks that the portal application has been independently verified and/or validated by a trusted $3^{rd}$ party (e.g., an online market place, device manufacturer, etc.). For example, the user device may check a digital signature of the portal application before installation and/or before execution.

As used herein, a "portal" or "portal application" refers to a software application that provides users with a single point of access to information, resources, and services from various sources. For example, an authorized retailer's portal application may provide a single point of access to their portfolio of different service providers.

Functionally, the user device 400 also stores information about the user in a user profile. The user device 400 also stores the user's account activity in one or more user accounts; for example, a retail account may include user account information with an authorized retailer, and one or more service accounts may include user account information with different service providers.

As used herein, a "profile" refers to a collection of information and preferences associated with an individual within a system, application, service, or other entity/group of entities. Profiles may include details such as contact information, active account information, demographic data, interests, behavior patterns, preferences, etc., depending on the context of the system or platform.

A closely related, but distinct, term "account" refers to a set of credentials that identify an individual within a system, application, service, or other entity/group of entities. User accounts may be used to authenticate the user, authorize the user for one or more functionalities, and/or track financial transactions (accounting). A user account may be unique to an entity, shared between multiple entities, or some hybrid thereof. For example, the user's device account may be linked to their retail account; similarly, the user's retail account may have some information that is replicated at various ones of the service accounts.

The techniques described throughout may be broadly applicable to user devices such as cellular phones, laptops, tablets, smart watches, smart glasses, personal computers, etc. Various other devices may be substitute with equal success by artisans of ordinary skill, given the contents of the present disclosure.

FIG. 4 is a logical block diagram of an exemplary user device 400. The user device 400 includes: a user interface subsystem, a network interface subsystem, a control and data subsystem, and a bus to enable data transfer. The following discussion provides a specific discussion of the internal operations, design considerations, and/or alternatives, for each subsystem of the exemplary user device 400.

User Interface Subsystem

Functionally, the user interface subsystem 404 may be used to present media to, and/or receive input from, a human user. Media may include any form of audible, visual, and/or haptic content for consumption by a human. Examples include images, videos, sounds, and/or vibration. Input may include any data entered by a user either directly (via user entry) or indirectly (e.g., by reference to a profile or other source).

The illustrated user interface subsystem 404 may include: a touchscreen, physical buttons, and a microphone. In some embodiments, input may be interpreted from touchscreen gestures, button presses, device motion, and/or commands (verbally spoken). The user interface subsystem may include physical components (e.g., buttons, keyboards, switches, scroll wheels, etc.) or virtualized components (via a touchscreen).

Other user interface subsystem 404 implementations may multiply, combine, further sub-divide, augment, and/or subsume the foregoing functionalities within these or other subsystems.

Network Interface Subsystem

Functionally, the network interface subsystem 406 may be used to transfer data to, and/or receive data from, external entities. The network interfaces are configured to communicate with other nodes of a communication network according to a communication protocol. Data may be received/transmitted as transitory signals (e.g., electrical signaling over a transmission medium.) The data interfaces are configured to read/write data to a removeable non-transitory computer-readable medium (e.g., flash drive or similar memory media).

The illustrated network interface subsystem 406 may include wireless subsystems (e.g., $5^{th}/6^{th}$ Generation (5G/6G) cellular networks, Wi-Fi, Bluetooth (including, Bluetooth Low Energy (BLE) communication networks), etc.) Furthermore, the techniques described throughout may be applied with equal success to wired networking devices. Examples of wired communications include without limitation Ethernet, USB, PCI-e. Additionally, some applications may operate within mixed environments and/or tasks. In such situations, the multiple different connections may be provided via multiple different communication protocols. Still other network connectivity solutions may be substituted with equal success.

More generally, any scheme for transmitting data over transitory media may be substituted with equal success for any of the foregoing tasks.

Control and Data Processing Subsystem

Functionally, the control and data processing subsystems are used to read/write and store data to effectuate calculations and/or actuation of the user interface subsystem and/or network interface subsystem. While the following discussions are presented in the context of processing units that execute instructions stored in a non-transitory computer-readable medium (memory), other forms of control and/or data may be substituted with equal success, including e.g., neural network processors, dedicated logic (field programmable gate arrays (FPGAs), application specific integrated circuits (ASICs)), and/or other software, firmware, and/or hardware implementations.

As shown in FIG. 4, the control and data subsystem may include one or more of: a central processing unit (CPU 402) and a non-transitory computer-readable medium 403 that stores program instructions and/or data.

A CPU 402 (such as shown in FIG. 4) may be primarily used to control device operation and/or perform tasks of arbitrary complexity/best-effort. CPU operations may include, without limitation: general-purpose operating system (OS) functionality (power management, UX), memory management, etc. Typically, such CPUs are selected to have relatively short pipelining, longer words (e.g., 32-bit, 64-bit, and/or super-scalar words), and/or addressable space that can access both local cache memory and/or pages of system virtual memory. More directly, a CPU may often switch between tasks, and must account for branch disruption and/or arbitrary memory access.

Other processor subsystem implementations may multiply, combine, further sub-divide, augment, and/or subsume the foregoing functionalities within these or other processing elements. For example, dedicated processors may be used to perform cryptographic tasks (e.g., verification of digital signatures) and/or media processing (e.g., video codecs and/or audio codecs). In other implementations, functionality may be subsumed with CPU operation via software emulation (e.g., software-based codecs, etc.).

In one embodiment, the memory subsystem 408 may be used to store data locally at the user device 400. In one exemplary embodiment, data may be stored as non-transitory symbols (e.g., bits read from non-transitory computer-readable mediums.) In one specific implementation, the memory subsystem including non-transitory computer-readable medium is physically realized as one or more physical memory chips (e.g., NAND/NOR flash) that are logically separated into memory data structures.

In some embodiments, the program code may be statically stored within the user device 400 as firmware. In other embodiments, the program code may be dynamically stored (and changeable) via software updates. In some such variants, software may be subsequently updated by external parties and/or the user, based on various access permissions and procedures.

Generalized Portal Application, Client-Side

In one embodiment, the non-transitory computer-readable medium includes a routine that enables authorized service provisioning via a portal application. When executed by the control and data subsystem, the routine causes the encoding device to: check a portal application, obtain customer information, and send a service request via the portal application.

In one embodiment, the customer service portal is implemented at the client device as a downloadable software application. The client-side customer service portal may interface with the authorized retailer's server-side counterpart. In other implementations, the client-side customer service portal may interface with the service provider's server-side counterpart. Still other hybrid variants may connect to an authorized retailer for certain types of services (e.g., account setup, customer service, etc.) and the service provider for other types of services (e.g., account deletion, account migration, etc.).

Instruction 412 causes the user device to check a portal application. In one embodiment, the check comprises a verification and/or validation of the portal application's digital signatures and/or other security protocols. As previously alluded to, the check may verify and/or validate a credential signed by an application store or other trusted 3rd party. Here, the term "trust" and its linguistic derivatives, within the context of cryptography, refers to a party having a known identity, integrity, and/or confidentiality. For example, the user device may have a private/public key relationship with its manufacturer; i.e., verifying the signed certificate identifies the manufacturer. In some cases, the credential may be validated to identify the presence of tampering—in other words, the presence of tampering could be identified via e.g., a failed checksum, hash, etc. In some cases, the certificate may also ensure some level of confidentiality and/or channel security—for example, the application binary may itself be further encrypted to prevent unauthorized access.

In one embodiment, the portal application may be verified once during its initial download and installation. In other embodiments, the portal application may be checked periodically. This may be useful, where for example, the trusted $3^{rd}$ party reviews the legitimacy of the entity. In some cases, the review may occur periodically or as-needed (e.g., triggered by a service provider, etc.).

Instruction 414 causes the user device to obtain customer information. In one embodiment, the user device may prompt the user via a client intake questionnaire and/or user profile setup screen. In other embodiments, the user device may scrape other sources of user data for information. For example, a user may provide their name, address, and phone number—this information may be used to scrape existing databases for previous history (e.g., credit history, service provider data bases, social media, etc.).

In one embodiment, the customer information may be stored in a local user profile database. The local user profile database may additionally be mirrored to/or from a user profile database at the authorized retailer. The user profile database may also be used to store a variety of other customer service information such as existing service accounts (type, class, billing history, etc.), previous service accounts, billing information, and/or any other customer service notes (e.g., complaints, feedback, frequency, etc.).

In some cases, the application may notify the user of potential offers they might be interested in. For example, upon setting up a customer profile, the portal application may identify offers that the user may qualify for. In other examples, the portal application may check for bundles (which are usually cheaper) when a user buys an a la carte service. Still other applications may allow a service provider to "push" new service offerings via the authorized retailer's customer portal. Yet other implementations may allow a customer to create a "watchlist" of interesting conditions e.g., price drops, new feature releases, etc.

In some embodiments, the application may provide a single navigation sequence for service requests. Here, the navigation sequence refers to the sequence of user actions within the portal application to cause a type of service request. For example, a single navigation sequence for account setup allows a user to setup their account, regardless of service provider. Similarly, a single user navigation sequence for customer service may allow a user to request a modification to reach customer service, regardless of service provider. Still other variants may provide multi-path navigation; this might be useful where different service providers provide different service request options, where the user defines custom paths (e.g., shortcuts), where the authorized retailer has an incentive e.g., to drive account generation or migrate services, etc.

Once a service request has been created, the user device sends the service request (instruction 416). In some embodiments, the server request is sent to the server-side application. In other embodiments, the server request may be directly routed to the appropriate customer service interface at the service provider. In some cases, the service request may be transmitted wirelessly via e.g., a radio modem. In other cases, the service request may be transmitted via a wired interface e.g., Ethernet. Typically, service requests may be sent over the broader internet either as plaintext or else as encrypted data.

In some embodiments, the service request may identify the customer service portal and/or the authorized retailer (or other point of origin). In some variants, the identification may be based on digital certificates and/or other signature mechanisms. Such data may be important for customer service tracking and/or lead generation metrics.

Server

FIG. 5 is a logical block diagram of a server 500. The server 500 includes: a network interface subsystem, a control and data subsystem, and a bus to enable data transfer.

The server 500 has many similarities in operation and implementation to the user device which are not further discussed below, the following discussion provides a discussion of the internal operations, design considerations, and/or alternatives, that are specific to server operation.

Network Interface Subsystem

Functionally, the network interface subsystem 506 may be used to transfer data to, and/or receive data from, external entities. The network interfaces are configured to communicate with other nodes of a communication network according to a communication protocol. Data may be received/transmitted as transitory signals (e.g., electrical signaling over a transmission medium.) The data interfaces are configured to read/write data to a removeable non-transitory computer-readable medium (e.g., flash drive or similar memory media).

Control and Data Processing Subsystem

The control and data subsystem 502 controls the server 500 operation and stores and processes transaction data. In one exemplary embodiment, the control and data subsystem uses processing units that execute instructions stored in non-transitory computer-readable medium (memory).

In one embodiment, the memory subsystem 508 may be used to store data locally at the server 500. In one exemplary embodiment, data may be stored as non-transitory symbols (e.g., bits read from non-transitory computer-readable mediums.) In one specific implementation, the memory subsystem including non-transitory computer-readable medium is physically realized as one or more physical memory chips (e.g., NAND/NOR flash) that are logically separated into memory data structures. Here, the memory subsystem may be bifurcated into program code and/or user profile data. In some variants, program code and/or data may be further organized for dedicated and/or collaborative use.

In some embodiments, the program code may be statically stored within the server 500 as firmware. In other embodiments, the program code may be dynamically stored (and changeable) via software updates. In some such variants, software may be subsequently updated by external parties and/or the user, based on various access permissions and procedures.

Generalized Portal Application, Server-Side

In one embodiment, the non-transitory computer-readable medium includes a routine that enables authorized service provisioning via a portal application. When executed by the control and data subsystem, the routine causes the encoding device to: check customer information, identify a service account, and re-direct the service request to the customer service interface.

While the following discussion is presented in the context of the authorized retailer's server-side application, analogous steps may be performed at the service provider's own customer service interface.

When the server receives a service request, the server may check the customer information (instruction 512). In some cases, the user's service request may include login information or other authentication/authorization information. In other cases, the user device may have already authenticated the user, and the service request may be post-authentication/authorization. In some embodiments, the service request may be signed by the client-side customer portal application, the authorized retailer, and/or any trusted $3^{rd}$ party—this may ensure that the service request originated from a genuine client/retailer/$3^{rd}$ party, is intact, and is not otherwise corrupted or malformed.

In some cases, the server request may validate and/or verify the customer information against its own records. For example, a request to add a service account may be checked to ensure that the customer qualifies for the service account. Similarly, a request to remove or modify a service account may be checked to ensure that the service account exists. Certain types of information may be more easily changed than others; for example, changes to a customer's address and billing information may require authentication and/or authorization whereas changes to watchlist conditions and/or other profile preferences may be handled without further verification.

In some cases, a request for a particular service may be checked against the customer profile to ensure that the service request is valid. Examples might include e.g., verifying a zip code, a credit history, a service history (e.g., hasn't left within 1 year, hasn't left within 10 years, etc.). Other examples might include e.g., price checks, in other words, a customer might unintentionally attempt to sign up for a service that is more expensive than necessary—this may be important to flag to the customer to ensure the switch was intended, etc.

Furthermore, while the foregoing examples are described in the context of a user-initiated service request, the concepts may be broadly applied to service requests initiated on behalf of the user e.g., according to a watchlist condition. Still other variants may "push" an offer to the user device, here the service request is offered (by the authorized retailer/service provider) and then acknowledged by the user.

At instruction 514, A service account is then identified based on the service request (instruction 514). In one embodiment, the service account may be identified within the service request. In other embodiments, the service account may be identified based on the service request and the customer profile.

In some cases, the identified service account is selected from a list of valid options. In other cases, the identified service account may be selected from the list of service accounts associated with the customer profile. In still other implementations, the selected service account may be identified within the context of all of the service accounts that are offered by the authorized retailer.

Once a service account is identified, then the service request may be re-directed or otherwise connected to the corresponding service interface (instruction 516). In some embodiments, a proxy service request is generated. The proxy service request may include information from the original service request but may also include information provided by the server-side application. For example, the original service request might identify a specific service offering, the proxy service request may additionally include customer profile information to assist in setup. Similarly, the original service request might identify the customer identity to setup the account, whereas the proxy service request may additionally include the authorized retailer's identity (which may be important for lead generation metrics).

In some cases, the proxy service request may be signed by the user device, the authorized retailer, or even the service provider.

It will be appreciated that the various ones of the foregoing aspects of the present disclosure, or any parts or functions thereof, may be implemented using hardware, software, firmware, tangible, and non-transitory computer-readable or computer usable storage media having instructions stored thereon, or a combination thereof, and may be implemented in one or more computer systems.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A method for providing authorized services, comprising:
   providing a portal application to a user device via an application store;
   verifying a user login via the portal application;
   obtaining a request for a selected service provider from the portal application;
   verifying the request for the selected service provider based on a user profile; and
   sending a proxy request to a customer service interface of the selected service provider.

2. The method of claim 1, where the portal application comprises a trusted credential signed by the application store and where the application store has a trusted relationship with the user device.

3. The method of claim 1, further comprising creating the user profile within a user profile database and storing an address and a billing data to the user profile.

4. The method of claim 3, further comprising retrieving the address and the billing data from the user profile upon successful verification of the request and where the proxy request comprises the address and the billing data.

5. The method of claim 4, where the proxy request causes a service account to be created with the selected service provider based on the address and the billing data.

6. The method of claim 5, where the selected service provider provides an other service, and sending an offer to add the other service to the service account.

7. The method of claim 4, where the selected service provider is selected based on the user profile.

8. An apparatus configured provision authorized services, comprising:
   a network interface;
   a user profile database;
   a processor; and
   a non-transitory computer-readable medium comprising instructions that when executed by the processor causes the apparatus to:
      create a user profile for a user within the user profile database;
      obtain a request from a portal application;
      verify the request based on the user profile; and
      send a proxy request to a customer service interface of a service provider based on the request.

9. The apparatus of claim 8, where the instructions further cause the apparatus to retrieve a list of suitable service providers based on the user profile and provide the list of suitable service providers to the portal application.

10. The apparatus of claim 9, where the instructions further cause the apparatus to obtain a selected service provider from the portal application, and where the proxy request causes the selected service provider to create a new service account.

11. The apparatus of claim 8, where the instructions further cause the apparatus to retrieve a list of service accounts based on the user profile and provide the list of service accounts to the portal application.

12. The apparatus of claim 11, where the instructions further cause the apparatus to obtain a modification request for a service account from the portal application, and where the proxy request causes the service provider to modify the service account.

13. The apparatus of claim 8, where the proxy request comprises a trusted credential that is signed by an authorized retailer.

14. The apparatus of claim 8, where the proxy request comprises a trusted credential that is signed by the service provider.

15. A non-transitory computer-readable medium comprising a portal application from an authorized retailer that when executed by a processor causes the processor to:
   create a retail account at a user device;
   obtain user information to create a user profile;
   obtain a list of service providers from the authorized retailer based on the user profile;
   select a service provider from the list of service providers, based on user input; and
   generate a request for the service provider.

16. The non-transitory computer-readable medium of claim 15, where the portal application comprises a trusted credential signed by an application store and where the application store has a trusted relationship with the user device.

17. The non-transitory computer-readable medium of claim 15, where the portal application comprises a trusted credential signed by the authorized retailer.

18. The non-transitory computer-readable medium of claim 15, where the portal application further causes the processor to determine an other service offered by the service provider and offer to add the other service to an existing service account.

19. The non-transitory computer-readable medium of claim 15, where the portal application further provides a single user navigation sequence for account creation at any service provider of the list of service providers.

20. The non-transitory computer-readable medium of claim 15, where the portal application further provides a single user navigation sequence to contact a customer service representative of the authorized retailer.

* * * * *